US006189172B1

(12) United States Patent
Baek

(10) Patent No.: US 6,189,172 B1
(45) Date of Patent: Feb. 20, 2001

(54) REMOVABLE LINER AND INFLATABLE BLADDER FOR SNOWBOARD BOOTS AND METHOD OF MANUFACTURE

(75) Inventor: Jai Keun Baek, San Diego, CA (US)

(73) Assignee: DC Shoes, Inc., Vista, CA (US)

( * ) Notice: Under 35 U.S.C. 154(b), the term of this patent shall be extended for 0 days.

(21) Appl. No.: 09/484,130

(22) Filed: Jan. 14, 2000

(51) Int. Cl.$^7$ .................................................. A43D 11/00
(52) U.S. Cl. .................. 12/142 P; 12/146 C; 36/93; 36/10; 36/117.6; 36/117.1; 36/89
(58) Field of Search .............................. 36/89, 93, 117.1, 36/117.6, 10; 12/146 C, 142 P

(56) References Cited

U.S. PATENT DOCUMENTS

| Re. 34,661 | 7/1994 | Grim . |
|---|---|---|
| 746,338 | 12/1903 | Keen . |
| 1,954,122 | 4/1934 | Fiori . |
| 2,582,648 | 1/1952 | Mowbray . |
| 2,638,601 | 5/1953 | Bullard . |
| 2,638,690 | 5/1953 | Bullard . |
| 2,774,152 | 12/1956 | Alber . |
| 2,830,585 | 4/1958 | Weiss . |
| 2,884,646 | 5/1959 | Alber . |
| 3,685,176 | 8/1972 | Ruby . |
| 3,724,104 | * 4/1973 | Eder et al. . |
| 3,744,159 | 7/1973 | Nishimura . |
| 3,758,964 | 9/1973 | Nishimura . |
| 3,760,056 | 9/1973 | Ruby . |
| 4,232,459 | 11/1980 | Vaccari . |
| 4,628,945 | 12/1986 | Johnson . |
| 4,724,627 | 2/1988 | Sisco . |
| 4,730,403 | 3/1988 | Walkhoff . |
| 4,744,157 | 5/1988 | Dubner . |
| 4,999,932 | 3/1991 | Grim . |
| 5,088,478 | 2/1992 | Grim . |
| 5,094,252 | 3/1992 | Stumpf . |
| 5,113,599 | 5/1992 | Cohen . |
| 5,253,435 | 10/1993 | Auger . |
| 5,257,470 | 11/1993 | Auger . |
| 5,277,695 | 1/1994 | Johnson . |
| 5,295,313 | 3/1994 | Lee . |
| 5,329,640 | 7/1994 | Hourigan . |
| 5,348,530 | 9/1994 | Grim . |
| 5,353,525 | 10/1994 | Grim . |
| 5,362,076 | 11/1994 | Thomas . |
| 5,389,065 | 2/1995 | Johnson . |
| 5,403,265 | 4/1995 | Berguer . |
| 5,489,259 | 2/1996 | Jacobs . |
| 5,692,321 | 12/1997 | Holstine . |
| 5,765,298 | 6/1998 | Potter . |
| 5,813,144 | 9/1998 | Prengler . |
| 5,833,639 | 11/1998 | Nunes . |
| 5,868,690 | 2/1999 | Eischen . |

FOREIGN PATENT DOCUMENTS

| 2845-824 | 5/1979 | (DE) . |
|---|---|---|
| 136415 | * 4/1985 | (EP) . |
| 2356-384 | 3/1978 | (FR) . |

* cited by examiner

Primary Examiner—Ted Kavanaugh
(74) Attorney, Agent, or Firm—K. David Crockett, Esq.; Crockett & Crockett

(57) ABSTRACT

A removable snowboard boot liner made from Ethyl Vinyl Acetate with an air bladder attached therein and a method of mass producing such liners. An oily chalk like substance consisting of 90% sweet starch, 9% lubricant and 1% stearate is included between the two sheets that make up the bladder. The bladder is attached to the EVA before the EVA is folded, stitched, heated and molded. This allows the bladder to be attached while the EVA is still flat and allows the attachment to be performed by machine stitching. The bladder is partially inflated before the EVA is heated and molded. The oily chalk like substance and the partial inflation of the bladder allows the installed bladder to pass through the heating and molding steps of the EVA without the two sheets that make up the bladder melting together. The invention also consists of a design and installation of the bladder that minimizes the amount of slipping of a wearer's foot and heal within the boot.

1 Claim, 3 Drawing Sheets

REMOVABLE LINER AND INFLATABLE BLADDER FOR SNOWBOARD BOOTS AND METHOD OF MANUFACTURE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION i. Field of the Invention

The present invention relates to removable snowboard boot liners and their method of manufacture. More specifically, the invention relates to unique removable snowboard boot liners made from Ethyl Vinyl Acetate ("EVA") containing an air bladder and their method of manufacture.

While removable liners present many advantages, one major disadvantage associated with removable liners is that the foot of an athlete wearing a snowboard boot with a removable liner has a tendency to slip and move within the boot. This slipping may be caused by the athlete's foot moving within the liner, by the liner moving within the outer boot, or by a combination of these two phenomena. The most common result of this slipping is that the heal of the athlete lifts up from the bed of the boot. This slipping and lifting makes it more difficult for the athlete to control the snowboard, results in blisters and increases the likelihood of more serious injuries to the athlete.

This slipping problem has been found in the context of ski boots. Multiple solutions to this problem in the field of ski boots have been presented including several variations on the theme of using an air bladder positioned at various locations between the foot of the athlete and the exterior of the boot. Air bladders also have been used in other types of footwear for various purposes.

This invention is specifically concerned with snowboard boot liners made of EVA having an inflatable air bladder incorporated therein and the mass production of such liners.

ii. Description of Related Art

Holstine U.S. Pat. No. 5,692,321 discloses an athletic boot such as a snowboard boot having a bladder system consisting of an upper and lower bladder in communication with each other disposed between the wearer's foot and the exterior of the boot. The upper and lower bladder system is a closed system. Thus, the overall inflation level of the bladder system is fixed and may not be readily adjusted. The system disclosed in Holstine is designed to give increased support to the ankle of a wearer when downward forces compress the lower bladder causing a corresponding inflation of the upper bladder. Holstine stresses that the disclosed boot provides the athlete with increased flexibility and range of motion of the athlete's foot when impact or operational forces are removed from the boot. Holstine does not disclose how his boot is to be produced.

Potter, et al. U.S. Pat. No. 5,765,298 discloses an athletic shoe with an inflatable bladder present in the ankle collar. The bladder has weld lines or other means incorporated therein to prevent the formation of restrictive vertical columns of pressurized gas in the medial and lateral section of the bladder. This allows increased flexibility and mobility of the wearer's ankle. Potter, et al. do not disclose how their product is to be produced.

Nishimura U.S. Pat. Nos. 3,758,964 and 3,758,964 disclose sports shoes containing an inflatable air bladder. The majority of Nishimura's disclosures focus on ski boots containing inflatable air bladders. Nishimura does not disclose the methods used to manufacture his products. Nor does Nishimura disclose the use of EVA as a liner material.

None of the foregoing prior art have suggested snowboard boot liners made of EVA having an inflatable air bladder incorporated therein and the mass production of such liners.

SUMMARY OF THE INVENTION

The present invention is directed to snowboard boot liners made of EVA having an inflatable air bladder incorporated therein and the mass production of such liners.

The steps involved in making a conventional snowboard boot liner from EVA are as follows:

1. The pattern of the liner must be cut from a flat sheet of EVA;
2. The EVA is then folded and stitched together to approximate the shape of the final liner;
3. The stitched EVA is placed on a last;
4. The stitched EVA on the last is heated to allow the EVA to be molded to its final shape; and
5. The heated EVA is molded to its final shape.

The method outlined above is well known to those in the art. The length of time and temperature used to heat the EVA in step 4 is well known to those ordinarily skilled in the art of making snowboard boot liners from EVA. However, for purposes of illustrative example, the heating may be accomplished in a tunnel oven set at about 100° C. The total residence time in the tunnel oven may be approximately five minutes. The exact methods used to accomplish the molding of the EVA to its final shape in step 5 is well known to those of ordinary skill in the art of making snowboard boot liners from EVA. However, for purposes of illustrative example, neoprene socks may be used.

Air bladders in shoes generally are made by placing one sheet of suitable material on top of a second sheet of suitable material, cutting out the material in the appropriate pattern and securing the sheets together to form the boundary of the bladder and any desired internal contours such as uninflated spaces to accommodate the ankle bones. Frequently the two sheets are attached together by melting both sheets together wherever a seam is desired.

The method of the invention allows the air bladder to be stitched into place on the EVA liner before the EVA is stitched and molded. This allows the air bladder to be stitched when the liner is still a flat sheet of EVA It would be extremely difficult, if not impossible, to attach the air bladder by machine stitching once the EVA has been folded, stitched, heated and molded. Prior to the invention of the method described in this patent, it was not possible to attach an air bladder made from typical materials known in the art of footwear air bladders prior to the heating and molding of the EVA. This is because the two sheets that make up the air bladder would melt together when the bladder went through the heating and molding process with the EVA. Thus, the bladder could not be inflated and would be useless. This made the mass production of EVA snowboard boot liners with inflatable bladders impractical.

The present method solves this problem by introducing a substance between the two sheets that make up the air bladder prior to the sealing of the seams of the bladder and partially inflating the air bladder prior to the heating and molding of the EVA liner. The introduction of this substance and partial inflation of the bladder keep the two sheets that make up the bladder separated during the heating and molding of the EVA In addition, the disclosed design and installation of the bladder minimizes the amount of slipping of the athlete's foot within the liner and minimizes the amount of lifting of the athlete's heal from the bed of the boot.

DETAILED DESCRIPTION OF THE PREFERRED EMBODIMENT

The following description is of the best presently contemplated modes of carrying out the invention. This description is made for the purpose of illustrating the general principles of the invention and should not be taken in a limiting sense.

Figure 2:
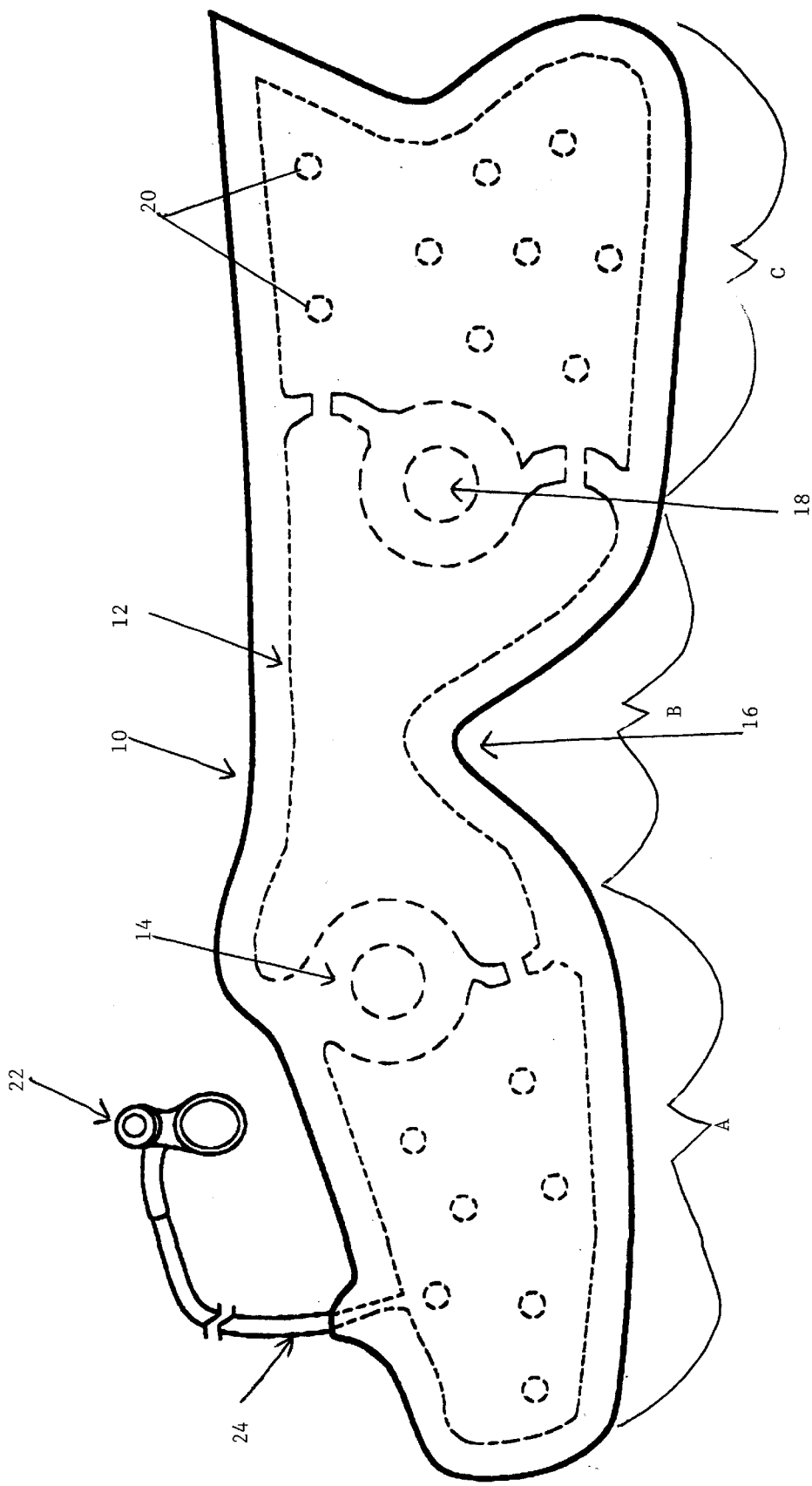
FIG. 2 is a view of the bladder assembly laid flat showing the specific seams of a bladder constructed in accordance with the principles of this invention.
Figure 3:
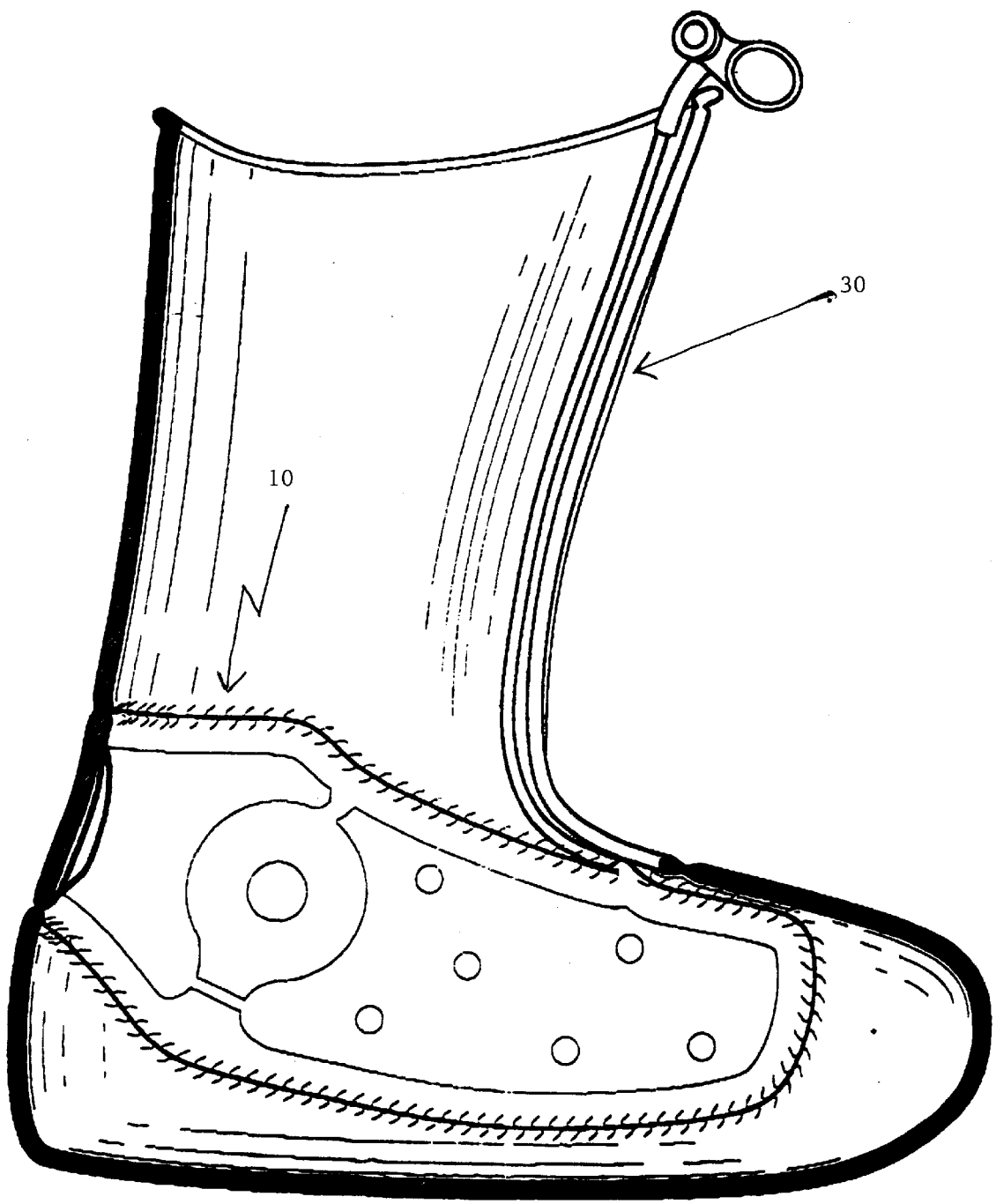
FIG. 3 is a cutaway view showing the bladder assembly installed within the liner.

The preferred embodiment of the invention will be described with reference to FIGS. 1, 2 and 3. The preferred embodiment of the bladder 10 is shown in FIG. 2. The most preferred material used to make the bladder is thermal poly urethane ("TPU"). The bladder consists of front and back sheets of TPU attached together along the perimeter by seam 12. The perimeter seam 12 prevents air from leaking out from the two sheets and allows the bladder to be inflated.

The bladder comprises three different sections labeled A, B and C. When installed, section A covers the medial instep portion of the foot stretching from the top of the foot around to the medial ankle bone. The perimeter seam is contoured to prevent inflation of the bladder where the bladder covers the medial ankle bone. Thus, when the bladder is inflated, the medial ankle bone fits into the uninflated region 14. Section B stretches from the medial ankle bone around the Achilles portion of the heel to the lateral ankle bone. An indentation in the perimeter of the bladder 16 is provided to accommodate the portion of the wearer's heal below the Achilles tendon. The perimeter seam defines a second uninflatable portion 18 to accommodate the lateral ankle bone. Section C stretches from the lateral ankle bone up to cover the lateral portion of the wearer's instep.

Figure 1:
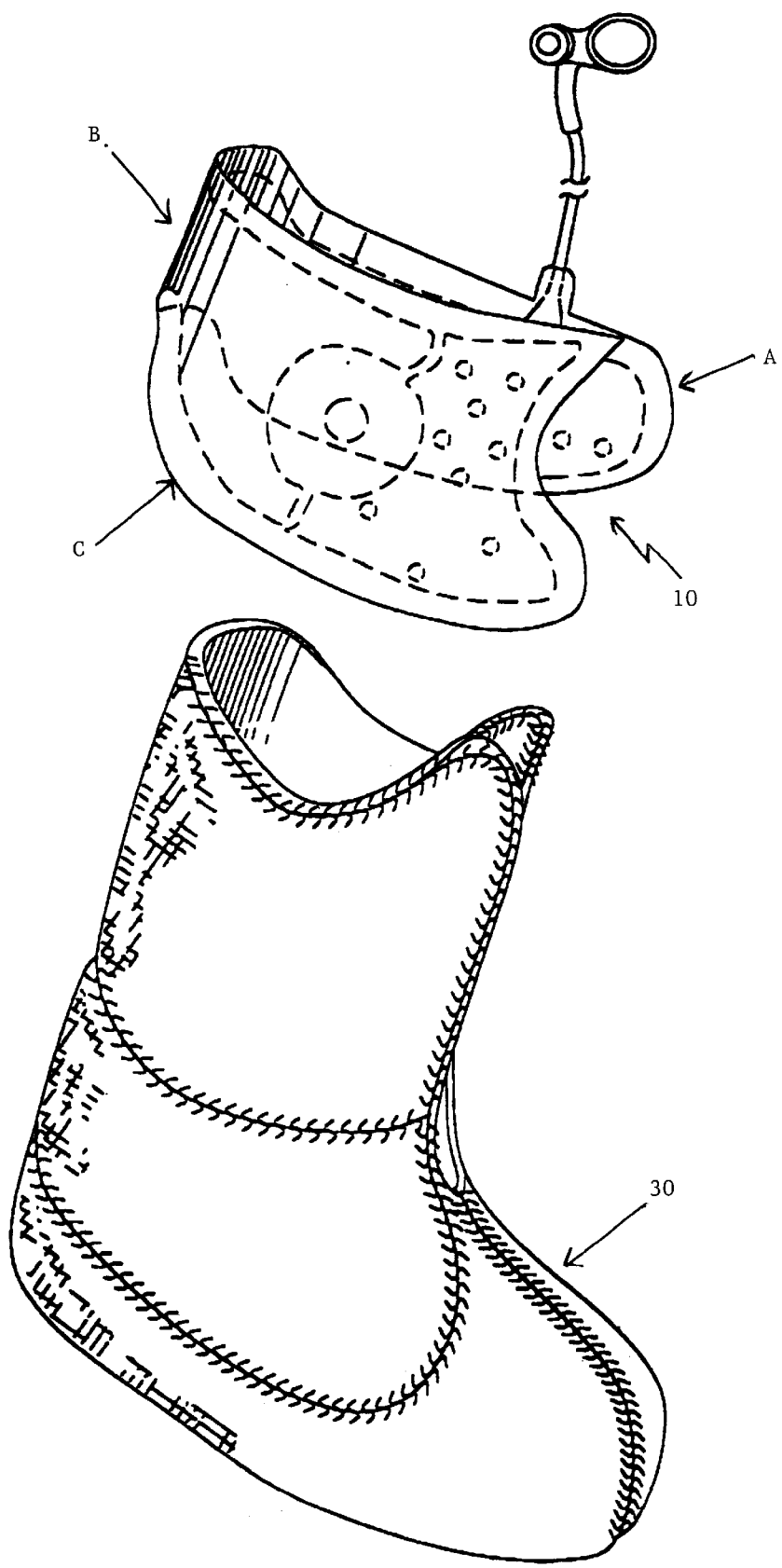
FIG. 1 is a side view of the stitched and molded liner with the bladder assembly positioned above the liner in the approximate orientation that the bladder would be attached inside the liner in accordance with the principles of this invention.

FIG. 1 shows the bladder 10 positioned above the stitched and molded liner 30 in approximately the orientation in which the bladder is preferably installed. Sections A, B and C area indicated in FIG. 1. FIG. 3 shows a cutaway view of the bladder 10 installed in the liner 30.

Referring again to FIG. 2, ring seams 20 are positioned throughout sections A and C of the bladder. These ring seams 20 control the thickness of the bladder when the bladder is inflated, An increased density of ring seams 20 results in a thinner bladder. There are no ring seams positioned in section B. This allows the maximum thickness to be achieved in section B which results in the wearer's heal being seated firmly in the bed of the boot and minimizes the amount of slipping and lifting of the heal.

A pump and air release valve assembly 22 is attached to air bladder 10 by tube 24. Tube 24 is made from thermal rubber. Preferably, the tube 24 is secured to the air bladder by thermal molding. Preferably, the pump and air release valve assembly 22 is secured to tube 24 by thermal molding. The pump and air release valve assembly and the tube are not critical to the invention and any suitable commercially available pump, tube and air release valve may be used provided that none of the components melt at the temperatures necessary to allow the molding of the EVA liner.

The preferred process for manufacturing the invention is as follows:

1. Dust the surface of a first sheet of bladder material with an appropriate substance;
2. Place a second sheet on top of the first sheet whereby the dusted substance is between the first and second sheet;
3. Cut out the appropriate shape for the air bladder;
4. Apply heat and pressure sufficient to melt the two sheets at points where the two sheets are to be attached together;
5. Cut out the appropriate shape of the liner from a sheet of EVA;
6. Attach the bladder to the EVA at the appropriate position;
7. Fold and stitch the EVA;
8. Inflate the bladder a small amount;
9. Place the EVA and bladder assembly on a last;
10. Heat the EVA and bladder assembly an appropriate amount; and
11. Mold the EVA to its final shape.

If desired, tubes, pump and air release valves may be added into the assembly to facilitate inflation and deflation of the bladder. It is preferred to insert these components prior to heating the various parts of the bladder in step 4. This allows the tubes, pumps and/or air release valves to be heat sealed into the bladder and results in a stronger bond than alternative methods of attachment such as glueing. In step 8, the bladder should be inflated enough to hold the two sheets apart but not so much that the bladder will burst when the air within it expands due to heating.

The most preferred substance with which to dust the first sheet of bladder material in step 1 is a Korean substance. The closest English translation known to the inventor is "powdered oil chalk." The Korean word for the substance spelled phonetically in English is "so-p-hil galu." The substance may be obtained from Dae Ho Commersial Co., LTD., #9 3 Buam, 1-Dong, Jin Gu, Pusan, Korea. The substance in Korean Characters is: 서필가루. For purposes of this document, the substance shall be referred to as "powdered oil chalk." The substance is made up of approximately 90% sweet starch, 9% lubricant and 1% stearate.

What is claimed is:

1. A method of manufacturing snowboard boot liners with inflatable bladders comprising the steps of:
   a. Applying a powdered oil chalk to the surface of a first sheet of bladder material;
   b. Placing a second sheet of bladder material on top of the first sheet whereby the powdered oil chalk is between the first and second sheet;
   c. Cutting out the shape of the bladder from the two sheets of bladder material;

d. Creating seems at points where the two sheets of bladder material are to be attached together;
e. Cutting out the shape of the liner from a sheet of EVA;
f. Attaching the bladder to the EVA at the appropriate position;
g. Folding and stitching the EVA;
h. Inflating the bladder a small amount;
i. Placing the EVA and bladder assembly on a last;
j. Heating the EVA and bladder assembly an appropriate amount; and
k. Molding the EVA to its final shape.

* * * * *